Aug. 20, 1940.    K. TANDETZKE    2,212,462
VEHICLE BODY
Filed July 16, 1937.
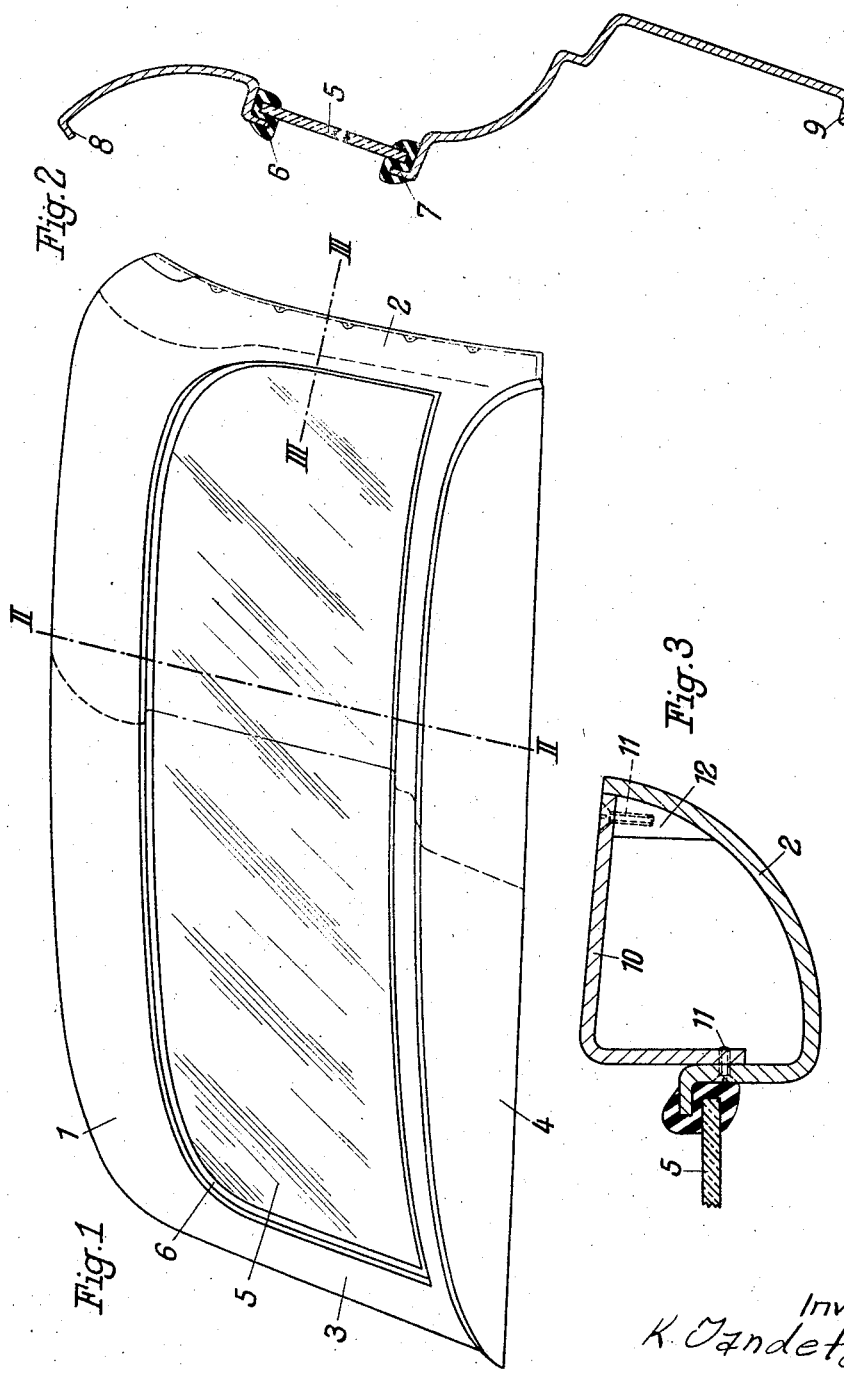

Patented Aug. 20, 1940

2,212,462

UNITED STATES PATENT OFFICE 2,212,462

VEHICLE BODY

Karl Tandetzke, Eigenheim, Berlin-Alt-Glienicke, Germany, assignor to Auto Union Aktiengesellschaft, Chemnitz, Germany Application July 16, 1937, Serial No. 154,074
In Germany July 17, 1936

1 Claim. (Cl. 296—31)

In the ordinary vehicle bodies for automobiles either a wooden frame-work forms the supporting structure and plywood or steel plates forming the outer shell are secured on this wooden framework, or the whole vehicle body consists of pressed sheet steel, in which case at the highly stressed points, for example at the front window frame or at the door posts, steel sections are used for taking up the principal forces, while the outer sheet metal serves substantially only as a covering. This is based on the fact that the sheet steel, in order to be capable of being satisfactorily pressed, must be made very thin and in the case of thin cross-sections, as for example at the front window frame, does not have sufficient strength for taking up the principal forces, but only has a certain local strength which protects the outer shell from becoming bulged by the action of shocks.

The invention provides a body for automobiles, using artificial resin or similar materials as the constructional material, and the novelty consists in this, that the outer shell of the vehicle body, which is composed of laminated artificial materials preferably artificial resin pressings containing layers of paper impregnated with artificial resin, is combined at the parts bounding the windows or other openings with an inner lining and with this forms the strength-giving structure. In this way it is possible to dispense with not only the usual wooden frame-work, but also the metal sections which are inserted in all-steel vehicles. This gives not only a very light construction, but also the manufacture becomes very simple, since the outer shell parts are pressed in the final form without it being necessary to attach separate sections during assembly.

There is obtained further, an ordinary box section with which both parts, namely outer shell and inner lining, can be secured together in a simple manner by connecting means, such as screws and the like. Such sections are extremely resistant to bending and completely replace the separate internal sections which are necessary in all-steel structures.

According to the invention the outer shell has a completely smooth surface, apart from any desired ornamental or useful ledges such as window frames and the like. This is particularly important because hitherto wherever the outer shell was utilised for supporting purposes, the strength had to be increased by the outer shell being provided with grooves or ridges or being made in the manner of corrugated sheet metal or having additional reinforcing sections applied. The strength of the smooth outer shell is obtained according to the invention, only by the surfaces being made arched and by edge parts adjoining these arched surfaces which are bent once or more than once at an angle to the remaining surfaces. In this way the outer shell is given increased strength at the places where large openings have to be provided, as for example, at the windows, which is greater than the strength of the separate frames which otherwise had to be affixed.

A constructional example of the invention is illustrated in the accompanying drawing.

Fig. 1 is a perspective view of a windscreen part of an automobile,

Fig. 2 is a cross-section on the line II—II of Fig. 1,

Fig. 3 is a cross-section on the line III—III of Fig. 1.

According to Figs. 1 and 2 the front part of the vehicle body consists of a pressing made in one piece from artificial resin pressed material with laminated paper as a filler and the notch shock strength of the material is approximately 25–30 cmkg/cm$^2$. For connecting it to the roof the front part has an upper edge 1, lateral edges 2, 3 bound the door opening and a lower adjoining edge 4 serves for connecting to the front end part of the body. This part, which is pressed in one operation, contains the opening enclosed by the parts 1, 2, 3, 4, for the windscreen 5 which is secured by means of a rubber packing 6 to the window frame 7 which is bent back at an angle to the outer surface of the pressing. Edge parts 8 and 9 form the periphery of the pressing on the outside and serve for attaching the other parts of the body. This connection is effected by means of steel screws, for which purpose the adjoining parts are likewise provided with bent back edges.

Fig. 3 illustrates the connection between the outer shell 2 or 3 bounding the window laterally with the inner lining 10 which consists of an angularly bent member which either lies flat on the inner surface of the outer wall and is connected therewith by screws 11, or abuts against the edge of the outer shell 2, 3, in which case the screws 11 enter into reinforcements 12 provided on the outer shell. The construction of the outer shell as a supporting member is described above only as applied to a windscreen structure. All other parts may, of course, be constructed in a similar manner. This applies more particularly to the rear side parts of the vehicle body in which comparatively narrow edge parts enclose the large side window openings and in which these frames can be closed on the inside by means of an inner lining in such a manner that similar box sections to that shown in Fig. 3 are obtained.

What I claim is:

In a vehicle body, an outer shell forming a part of the vehicle body and composed of laminated pressed artificial materials containing layers of paper impregnated with artificial resin, said shell having an opening therein, said shell laterally of said opening being outwardly arched to increase the strength of the shell adjacent the opening, said shell adjacent said opening extending at a substantial angle to the surface of the shell so as to form an integral rib-like frame of laminated pressed artificial material imparting additional strength to the shell adjacent the opening, an angular shaped lining arranged within the shell adjacent said arched portion, means for securing one edge of said lining to the shell adjacent said opening, reinforcing members carried by the arched portion of the shell and means for securing the other edge of the lining to said reinforcing members.

KARL TANDETZKE.